United States Patent [19]
Vecht

[11] 3,731,353
[45] May 8, 1973

[54] METHOD OF MAKING ELECTROLUMINESCENT DEVICES

[76] Inventor: Aron Vecht, 95 Corringham Rd., London, England

[22] Filed: Apr. 24, 1972

[21] Appl. No.: 247,218

Related U.S. Application Data

[63] Continuation of Ser. No. 6,419, Jan. 28, 1970, abandoned.

[30] Foreign Application Priority Data

Feb. 16, 1972  Great Britain..................4,566/72

[52] U.S. Cl.........29/25.13, 117/33.5 E, 252/301.6 S
[51] Int. Cl.................................................H01j 9/00
[58] Field of Search................29/25.1, 25.11, 25.13, 29/25.17; 117/33.5 E; 252/301.6 S

[56] References Cited

UNITED STATES PATENTS

| 3,178,580 | 4/1965 | Vogel | 252/301.6 S X |
| 3,299,307 | 1/1967 | Inoue | 252/301.6 S X |
| 3,418,248 | 12/1968 | Thornton, Jr. | 252/301.6 S |
| 3,440,471 | 4/1969 | Baczewski et al. | 252/301.6 S X |

Primary Examiner—J. Spencer Overholser
Assistant Examiner—Richard Bernard Lazarus
Attorney—Gordon W. Daisley et al.

[57] ABSTRACT pg,1 A process for making an electroluminescent device comprising a particle-bearing matrix of phosphor particles in a transparent binder wherein the particles are a compound of an element of Group IIb and an element of the group consisting of sulphur and selenium with an admixture of an activator and a coating of a Group Ib element. A layer of particle-bearing matrix is arranged between two electrodes and a direct current is passed therethrough until a high electrical resistance has been formed in a predetermined region of the layer, whereby in subsequent service the predetermined region produces a high electroluminescence.

9 Claims, 5 Drawing Figures

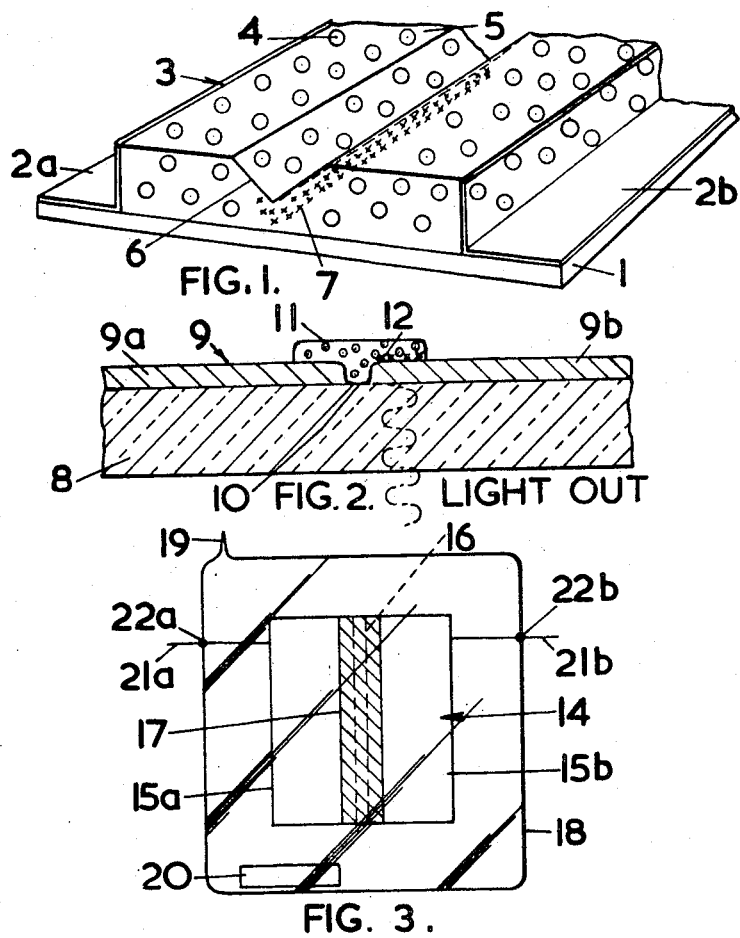
FIG. 1.
FIG. 2.
FIG. 3.
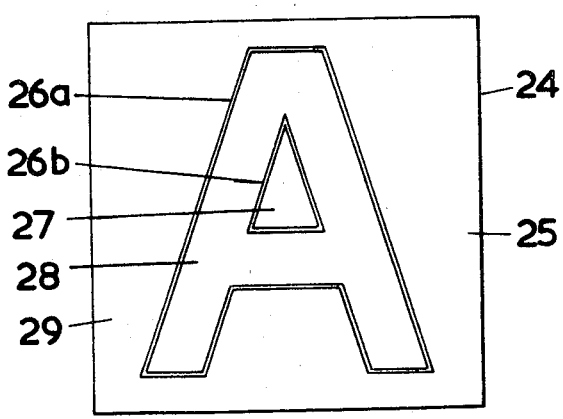
FIG. 4.

METHOD OF MAKING ELECTROLUMINESCENT DEVICES

This is a continuation, of application Serial No. 6,419 filed Jan. 28, 1970 and now abandoned.

The invention relates to electroluminescent devices in which phosphors in powder form are embedded in a translucent matrix and electroluminescence is produced by the application of an electric current.

Commonly used phosphors include compounds of an element of Group IIb of the Periodic Table with an element of the group consisting of sulphur and selenium, for example zinc sulphide, or a mixture of such compounds, but even when activated by the introduction of various elements such as manganese into the lattice structure such phosphors do not produce very much luminescence when a direct current is applied.

The invention provides a process for making from such phosphors in powder form greatly improved electroluminescent devices which can have a greatly increased luminescence especially in a desired region having a required shape or configuration.

A particular advantage of devices in accordance with the present invention is that they can produce this electroluminescence when D.C. voltages as well as A.C. voltages are applied.

According to the invention, a process for making an improved electroluminescent device comprises producing phosphor particles made of a compound or compounds of an element of Group IIb with an element of the group consisting of sulphur and selenium with the admixture of an activator, coating said phosphor particles with an element of Group Ib, embedding said coated particles in a translucent matrix, arranging the particle-bearing matrix as a phosphor layer in contact with two electrodes, and passing a forming direct electrical current between the two electrodes until the electrical resistance is increased in a localised and predetermined region of the phosphor layer, whereby when a direct electrical current is passed between the electrodes when the electroluminescent device is subsequently used in service, the luminescence of the predetermined region of the phosphor layer is at least 100 times what it would be if uncoated phosphor particles as aforesaid had been used.

The increase in the electrical resistance normally occurs within a minute or so and normally increases by the order of a factor of tens. The rate of dissipation of energy during the forming process is preferably between 0.5 and 5 watts per sq. cm. of the surface area of the phosphor layer. The D.C. voltage across the electrodes is normally simply adjusted to produce the desired effect.

The increase in electrical resistance and likewise the subsequent luminescence occurs almost entirely in a localised region of the phosphor layer whose position can be predetermined in various ways.

The localised region can be readily predetermined by locally constricting the cross-sectional area of the phosphor layer through which the forming electrical current has to pass. This may be achieved by simply forming a groove in the surface of the phosphor layers. The application of heat to or the generation of heat within a predetermined local region can also ensure that the increased resistance and ensuing luminescence occurs within such a region.

If otherwise substantially uniform physical conditions are preserved in the phosphor layer, the localised region normally forms relatively near to the electrode or electrodes made positive when the forming electrical current is passed. As the localised region which thus forms in the phosphor layer normally extends fairly closely alongside the entire interface with these electrode or electrodes, the position of the localised region in these circumstances is predetermined by the position or disposition of the electrode or electrodes. In these circumstances the shape or configuration of the luminescence produced is predetermined by the disposition of the electrode made positive during the forming process.

After the localised region has been duly formed by the application of the direct current, the device may be subsequently made to luminesce by the application of an alternating or direct current, of whichever polarity desired, as the forming process is substantially irreversible.

The phosphor particles preferably comprise a compound of an element of Group IIb, preferably zinc, with an element of group consisting of sulphur and selenium, or a mixture of such compounds, an activator, and a coating of an element of Group Ib. The compound is preferably zinc sulphide or zinc selenide, and the mixture or solid solution of such compounds can be a mixture of zinc sulphide and zinc selenide. An effective activator is manganese although other known activators can be used including copper in addition to manganese.

The coating is preferably copper buy may alternatively be gold or silver.

The Group Ib metal coating referred to here and throughout the specification is not normally in the form of a continuous metallic deposit but the element is usually present in the surface of the particle as part of a complex surface phase in which the atoms of the host lattice may in part have been replaced by the Group Ib element.

The Group Ib metal can be coated onto the phosphor particles by the use of organometallic compounds or by simply reacting the phosphor particles with a salt of the Group Ib metal in solution. When copper is used the amount deposited in the coating should be of the order of 0.2 percent by weight of the phosphor particles.

The translucent matrix in which the phosphor particles are embedded may, for example, be polymethylmethacrylate or nitrocellulose.

The proportion of phosphor particles to transparent binder may vary over wide limits, but is generally between 10 percent and 25 percent wt./wt. binder to powder.

An electroluminescent device made according to the process is desirably encapsulated in a translucent vessel containing a substantially inert gas, such for example as nitrogen, together with a drying agent in order to prolong its active life.

The light given out by the formed electroluminescent device is considerably brighter for a particular applied voltage than the light given out by electroluminescent devices produced from uncoated phosphor powder and without the forming process. This increase in brightness is at least 100 times, i.e. two orders of magnitude, and may well be considerably more. Alternatively, a lower voltage may be applied to the said formed device to produce at least the same brightness as from an uncoated device. This is advantageous when the device is incorporated in batter-powered circuits or circuits including transistors.

A suggested use of such formed electroluminescent devices is in the form of illuminated letters or numerals. The letter etc. may be scribed in a layer of phosphor-bearing matrix or alternatively a conducting layer on a substrate may be etched away to give a gap or channel corresponding to a letter or numeral. By using a double gap with a narrow intermediate conducting strip, double-illuminated letters may be produced. A double gap can also be used to provide an illuminated letter in which the entire phosphor layer between the gaps luminesces.

The invention will be further described with reference to the accompanying drawings in which:

FIG. 1 illustrates an electroluminescent device in which the phosphor layer between the electrodes has been constricted by the formation of a groove.

FIG. 2 illustrates an electroluminescent device in which a phosphor layer has been applied across a gap in a conducting layer.

FIG. 3 illustrates an encapsulated electroluminescent device.

FIG. 4 illustrates a letter produced by the method illustrated in FIG. 2.

Figure 5:
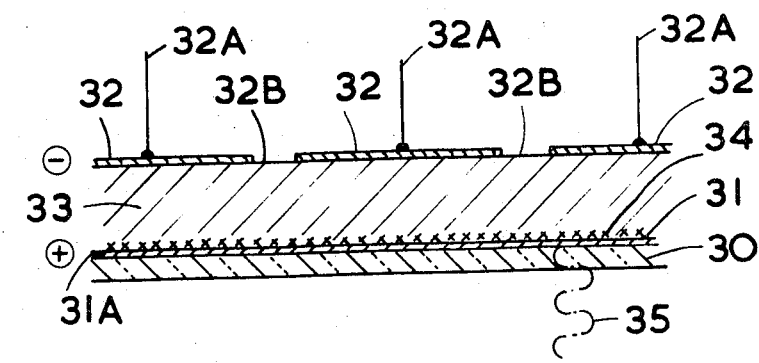
FIG. 5 illustrates in section an electroluminescent device of sandwich construction.

In FIG. 1 reference numeral 1 indicates a non-conducting substrate to which electrodes 2a and 2b are applied and between and in electrical contact with said electrodes is applied a layer of phosphor containing matrix 3 consisting of coated phosphor particles 4 embedded in a transparent matrix 5. The thickness of the layer is typically of the order of 50 micron. By drawing a scriber (not shown) across the matrix surface a groove 6 may be made. When a D.C. current is passed between electrodes 2a and 2b a layer of high resistance indicated generally at 7 is formed along the groove 6. After this forming process has occurred, when a D.C. and/or A.C. current is passed between the electrodes 2a, 2b the phosphor particles in the region of high resistance 7 exhibit luminescence. It is convenient to monitor the voltage and current during the forming process, initially increasing the voltage from a low value, so that the rate of dissipation of energy remains within the range of 0.5 watt to 5 watt per square centimetre of surface of the phosphor layer. The electrical resistance increases by a factor of about 10 as a result of the forming process.

In FIG. 2 reference numeral 8 indicates a non-conducting substrate to which a layer of conducting material 9 is applied. A gap 10 is made in the conducting material 9 such that the said conducting material is arranged as two electrodes 9a and 9b. A phosphor-containing matrix 11 is applied across the gap 10 and when a D.C. current is passed a region of high resistance 12 is formed in the said phosphor-containing matrix so that when a D.C. and/or A.C. current is passed the phosphor luminesces in the region 12.

FIG. 3 illustrates an electroluminescent device 14 similar to that illustrated in FIG. 2 in the form of electrodes 15a and 15b separated by a gap indicated by the broken lines and a layer of phosphor-containing matrix 17 arranged across the gap 16 and indicated by shading. The said device 14 is enclosed in a translucent capsule 18 which has been evacuated then filled with nitrogen gas at 19 and contains a desiccant material 20. Electrical current may be passed through the device 14 through electrical conductors 21a and 21b connected to the electrodes 15a and 15b and sealed into the capsule walls at 22a and 22b.

In FIG. 4 reference numeral 24 indicates a substrate to which a layer 25 of conducting material has been applied. Said conducting material has been partially removed to leave gaps 26a and 26b in such a configuration as to form a letter A. A layer of phosphor-containing matrix (not shown) may be applied across the gaps 26a and 26b. The conducting layer may be considered as three regions 27, 28 and 29. If electrical connections (not shown) are arranged so that regions 27 and 29 are of the same polarity while region 28 is of the opposite polarity and a D.C. current is applied, then regions of high resistance will form in the phosphor layer following the line of gaps 26a and 26b, such that when a D.C. and/or A.C. voltage is applied in a manner such that regions 27 and 29 are of the same + ve polarity and region 28 is of − ve polarity then electroluminescence will occur in the regions of high resistance in the phosphor layer such that the letter A will be outlined.

The invention may be applied to the kind of electroluminescent device illustrated diagrammatically in FIG. 5, i.e., a "sandwich" device. The device comprises a support 30, desirably of glass, a conducting layer 31, a phosphor layer 33 and a second conducting layer 32, the conducting layers acting as electrodes. The conducting layer 31 may be, for example, a film of tin oxide, or indium oxide, while 32 may be, for example, aluminium-graphite or copper. It is found that if a direct current is passed through the phosphor layer 33 via the conducting layers, with layer 31 + ve as shown, to form a high resistance region within the phosphor layer, a high resistance region forms at 34 near to the conducting layer 31. Light is emitted from the formed high resistance region, as indicated by reference 35. Forming of the high resistance region is in this case associated with local self heating. Such a device may be modified to allow one or more regions of the phosphor layer 33 to be illuminated. The conducting layers 31, 32 instead of being continuous over the whole area of the phosphor layer 33 are arranged as arrays of strips separated from one another by spaces indicated at 32B, strips in one array being arranged at right angles to strips in the other. Electrical connections are made to each strip, as indicated at 31A and 32A. By selection of appropriate connections in each array, a selected portion of the phosphor layer 33 may be made to luminesce.

In normal circumstances, the magnitude of the electroluminescence produced in service increases with the applied voltage within practical limits and individual devices can be designed to operate with different applied voltages, typical values ranging from say 30v or 50v up to a few hundred volts. The operating voltage is not of course limited to the voltage applied to produce a forming electric current as previously described.

It will be appreciated from the foregoing description that the invention provides electroluminescent devices which can be made to produce high luminescence over a desired area whose shape, size or configuration can be predetermined either by the extent and position of the interface between the phosphor layer and the electrode or electrodes chosen to be positive in the forming process whilst maintaining substantially uniform physical conditions, i.e. current density and heating effects, throughout the phosphor layer away from the said interface, or by the extent and position of a selected local region of the phosphor layer which is purposefully subjected to distinct physical conditions which give rise to a local increase in heating and/or electrical resistance in the selected region when the forming electric current is flowing.

I claim:

1. A process for making an electroluminescent device which comprises producing phosphor particles made of at least one compound each of an element of Group IIb with an element of the group consisting of sulphur and selenium with an admixture of an activator, coating said phosphor particles with an element of Group Ib, embedding said coated particles in a translucent matrix, arranging the particle-bearing matrix as a single phosphor layer in contact with and between two electrodes, and increasing the electrical resistance in a localised predetermined region of the phosphor layer by passing a forming direct electrical current between the two electrodes and through said localised region, whereby when an electrical current is passed between the two electrodes when the electroluminescent device is subsequently used in service, the luminescence of the localised region of the phosphor layer is at least 100 times what it would have been if uncoated phosphor particles as aforesaid had been used.

2. A process for making an electroluminescent device which comprises producing phosphor particles made of at least one compound each of an element of Group IIb with an element of the group consisting of sulphur and selenium intermixed with an activator, coating said phosphor particles with an element of Group Ib, embedding said coated particles in a translucent matrix, arranging the particle-bearing matrix as a single phosphor layer in contact with and between two electrodes, forming the interface between a selected one of the electrodes and the phosphor layer to conform to a desired configuration of shape, and increasing the electrical resistance in the phosphor layer in a localised predetermined region which is relatively near to the interface with the positive electrode by passing a forming direct electrical current between the two electrodes and through said localised region with the selected electrode functioning as the positive electrode, whereby when an electrical current is subsequently passed between the electrodes when the electroluminescent device is used in service, the luminescence of the predetermined region of the phosphor layer is at least 100 times what it would have been if uncoated phosphor particles as aforesaid had been used.

3. A process according to claim 2 wherein the said electrodes are supported by a substrate with an intervening space between them which is filled with the phosphor layer, the interface between the phosphor layer and the electrode chosen to be the positive electrode when the said forming current is passed being so formed as to follow a predetermined configuration across the substrate, whereby luminescence is subsequently localised in a predetermined region which follows said configuration.

4. A process for making an electroluminescent device which comprises producing phosphor particles made of at least one compound each of an element of Group IIb with an element of the group consisting of sulphur and selenium with an admixture of an activator, coating said phosphor particles with an element of Group Ib, embedding said coated particles in a translucent matrix, arranging the particle-bearing matrix as a single phosphor layer in contact with and between two electrodes, and increasing the electrical resistance in a localised predetermined region of the phosphor layer by passing a forming direct electrical current between the two electrodes and through said localised region, the region being predetermined by making its physical condition purposefully different from that elsewhere in the layer so that a local increase in heating and/or electrical resistance is caused by the forming electrical current, whereby when an electrical current is subsequently passed between the electrodes when the electroluminescent device is used in service, the luminescence of the localised region of the phosphor layer is at least 100 times what it would have been if uncoated phosphor particles as aforesaid had been used.

5. A process according to claim 4 wherein the cross-sectional area of the phosphor layer through which the forming electrical current can pass between the electrodes is constricted in the predetermined localised region.

6. A process according to claim 4 wherein heat is applied to the predetermined localised region.

7. A process according to claim 1 wherein the phosphor particles comprise at least one of the compounds zinc sulphide and zinc selenide.

8. A process according to claim 1 in which the activator includes manganese.

9. A process according to claim 1 in which the Group Ib element is copper.

* * * * *

UNITED STATES PATENT OFFICE
CERTIFICATE OF CORRECTION

Patent No. 3,731,353        Dated May 8, 1973

Inventor(s) Aron Vecht

It is certified that error appears in the above-identified patent and that said Letters Patent are hereby corrected as shown below:

Cover page, item [30], "Feb. 16, 1972  Great Britain 4,566/72" should read -- Jan. 28, 1969  Great Britain 4566/69 -- .  Item [57], line 2, delete "pg,1".

This certificate supersedes Certificate of Correction issued October 23, 1973.

Signed and sealed this 8th day of January 1974.

(SEAL)
Attest:

EDWARD M. FLETCHER, JR.
Attesting Officer

RENE D. TEGTMEYER
Acting Commissioner of Patents